US008977703B2

(12) United States Patent
Müller et al.

(10) Patent No.: US 8,977,703 B2
(45) Date of Patent: Mar. 10, 2015

(54) CLUSTERING WITHOUT SHARED STORAGE

(75) Inventors: Thomas Müller, Herzogenbuchsee (CH); Dominique Pfister, Basel (CH)

(73) Assignee: Adobe Systems Incorporated, San Jose, CA (US)

(*) Notice: Subject to any disclaimer, the term of this patent is extended or adjusted under 35 U.S.C. 154(b) by 115 days.

(21) Appl. No.: 13/205,030

(22) Filed: Aug. 8, 2011

(65) Prior Publication Data

US 2013/0198309 A1    Aug. 1, 2013

(51) Int. Cl.
*G06F 15/16* (2006.01)

(52) U.S. Cl.
USPC .......................... 709/210; 709/208; 709/209

(58) Field of Classification Search
None
See application file for complete search history.

(56) References Cited

U.S. PATENT DOCUMENTS

| | | | | |
|---|---|---|---|---|
| 5,913,227 A * | 6/1999 | Raz et al. | ...................... | 711/152 |
| 6,014,669 A * | 1/2000 | Slaughter et al. | ............... | 707/10 |
| 6,636,982 B1 | 10/2003 | Rowlands | | |
| 6,694,337 B1 * | 2/2004 | King et al. | ..................... | 707/623 |
| 6,728,905 B1 | 4/2004 | Gnanasivam et al. | | |
| 6,851,005 B1 | 2/2005 | Gnanasivam et al. | | |
| 2005/0283658 A1 | 12/2005 | Clark et al. | | |
| 2008/0046400 A1 | 2/2008 | Shi et al. | | |
| 2008/0140734 A1 | 6/2008 | Wagner | | |
| 2009/0287892 A1 * | 11/2009 | Sharma et al. | ................. | 711/156 |
| 2011/0010330 A1 * | 1/2011 | McCline et al. | .............. | 707/602 |

OTHER PUBLICATIONS

"How do I install software downloaded in a Zip file?", Web document, from http://kb.winzip.com/kb/entry/71, May 27, 2010.*
"Step-by-Step Guide to Installing Cluster Service", Web document, from http://technet.microsoft.com/en-us/library/bb727114.aspx, Jul. 30, 2010.*
NPL, Gray et al. "The Dangers of Replication and a Solution", SIGMOD Conference publication, Jun. 1996.*
Hogan, M., A Primer on Database Clustering Architectures, ScaleDB Inc., 4 pages, web page available at http://www.scaledb.com/pdfs/ArchitecturePrimer.pdf, as available via the Internet.
Mueller, T., Append-Only Storage, CRX Tar PM, web page available at http://dev.day.com/content/ddc/blog/2008/11/tarpm.html, as available via the Internet and printed Aug. 10, 2011.

(Continued)

*Primary Examiner* — Wing F Chan
*Assistant Examiner* — Padma Mundur
(74) *Attorney, Agent, or Firm* — Kilpatrick Townsend & Stockton LLP

(57) ABSTRACT

One embodiment involves communicatively connecting a master node and a plurality of slave nodes in a cluster without shared storage where each node has a separate repository. Each node in the cluster without shared storage can be configured to exclusively update its repository. The method may include receiving a lock request from a first slave node in the cluster without shared storage. The lock request may be associated with an update request received by the first slave node. The lock request can indicate that the first slave node requires exclusive write access to a data item in the repository of the first slave node. The method includes sending a response to the first slave node granting the lock request based at least in part on data in the repository of the master node. The response may authorize the first slave node to append data to the data item in the repository of the first slave node.

25 Claims, 7 Drawing Sheets

(56) References Cited

OTHER PUBLICATIONS

CRX Clustering (Overview/CRX2.1/Administering), Adobe Product Solutions, web page available at http://dev.day.com/content/docs/en/crx/2-1/administering/cluster.html#Example%20Cluster, as available via the Internet and printed Aug. 10, 2011.

CRX Clustering (Overview/CRX2.2/Administering), Adobe Product Solutions, web page available at http://dev.day.com/docs/en/crx/current/administering/cluster.html#GUI%20Setup%20of%20Shared%20Nothing%20Clustering, as available via the Internet and printed Aug. 10, 2011.

* cited by examiner

CLUSTERING WITHOUT SHARED STORAGE

FIELD OF THE INVENTION

This disclosure relates generally to clustering computers and more particularly relates to clustering without shared storage.

BACKGROUND

A computer, and in particular a server, may be used to make various types of electronic content available to requesting client devices. While using a single computer to send electronic content to client devices allows for a simple configuration, it also results in disadvantages. For example, a single computer may be limited in the number of client devices it can communicate with at any given time. Furthermore, a hardware or software failure in the computer may result in electronic content being unavailable to client devices. A failure may also result in valuable data being lost or destroyed. Thus, a single computer does not provide the scalability, performance, high-availability, and failure recovery mechanisms often required when providing electronic content to requesting client devices.

In an attempt to address some of these concerns, computers can be linked together to form a cluster. In a cluster environment, the group of computers works closely together and in many respects perform as a single computer but without many of the limitations of a single computer. For example, a cluster can communicate with a larger number of client devices at any given time than a single computer. In addition, because of redundancies between computers in the cluster, a hardware or software failure in a single computer in the cluster may not result in the loss or destruction of data. Even if data is lost or destroyed in the cluster, often times the loss or destruction is minimized. Furthermore, if a single computer fails, other computers in the cluster may be able to provide various types of electronic content to requesting client devices. Thus, a cluster environment may provide scalability, performance, high-availability, and failure recovery mechanisms needed when providing electronic content to requesting client devices.

Clustering computers, however, adds numerous layers of complexity as opposed to configuring a single computer to make various types of electronic content available to requesting client devices. For example, in a cluster environment, there needs to be a mechanism in place that determines which of the computers in the cluster will respond to a particular request from a client device. Furthermore, each of the computers in the cluster needs to have access to up-to-date information so that the correct response to a particular request is provided to the client devices.

Generally, there are two predominate architectures used for clustering computers: shared-disk and shared-nothing. In a shared-disk cluster, an array of disks-usually a Storage Area Network (SAN) or Network Attached Storage (NAS)-stores all of the data associated with the cluster. Each computer, or node, in the cluster has access to all of the data and can request and store data in real-time to and from the SAN or NAS. Because each node can update the database, a shared-disk cluster has a master-master architecture. If one node in the cluster fails, the other nodes can still handle requests from client devices and can communicate with the SAN or NAS. However, if the SAN or NAS fails or if communication between the SAN or NAS and the nodes is severed, then none of the nodes in the cluster may be able to access the data associated with the cluster. Thus, while a shared-disk cluster provides scalability and load-balancing, a shared-disk cluster may have a single point of failure in the SAN or NAS. Furthermore, because each computer in the cluster communicates with the same SAN or NAS, the scalability of the cluster may be limited by the number of requests the SAN or NAS can handle over a given period of time.

The other predominate cluster architecture is a shared-nothing architecture. In a traditional shared-nothing cluster, each node has sole ownership of the data on that node and does not share the data with any other node in the cluster. Data is typically divided across multiple nodes. For example, one node may contain data regarding users, a second node may contain data regarding orders, and a third node may contain regarding products. Thus, data is partitioned across the nodes in the shared-nothing cluster and each of these nodes is called a master node. When a request from a client device is received, a routing table determines which master node in the cluster has the data needed for the request and routes the request to that node. In order to provide scalability and higher reliability, a mirrored copy of a master node is copied to one or more slave nodes. Only the master node in the cluster can update data associated with the master node, but any of the slave nodes associated with the master node can read data.

Traditionally, installing a shared-nothing cluster required manually configuring each of the nodes in the shared-nothing cluster. For example, a node may need to be manually configured in order for the node to recognize that it is a master node. Other nodes associated with a particular master node may need to be manually configured to be slave nodes so that they can read data but cannot write data associated with the master node. If a particular master node fails, then one of the slave nodes that used to be associated with the master node may need to be manually reconfigured so that the node becomes the master node. Until the manual reconfiguration takes place, the ability to write data related to the master node may not be possible.

Existing shared-disk and shared-nothing clusters address some aspects of scalability, performance, high-availability, and failure recovery mechanisms often required when providing electronic content to requesting client devices. However, each of the currently existing clusters has numerous disadvantages and suffers from various deficiencies. Systems and methods that address at least some of these disadvantages and deficiencies are needed.

SUMMARY

One exemplary embodiment involves receiving, by a processor in communication with a master node, a lock request from a first slave node in a cluster without shared storage. The lock request may be associated with an update request received by the first slave node. The lock request can indicate that the first slave node requires exclusive write access to a data item in the repository of the first slave node. The master node may be communicatively connected with a plurality of slave nodes. The plurality of slave nodes can include the first slave node. The master node and the plurality of slave nodes may comprise the cluster without shared storage. Each node in the cluster without shared storage may be connected with a separate repository. Each node in the cluster without shared storage can be configured to exclusively update data in its repository. The method may comprise sending, by the processor in communication with the master node, a response to the first slave node granting the lock request based at least in part on data in the repository of the master node. The response may authorize the first slave node to append data to the data item in the repository of the first slave node.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Systems and methods disclosed herein relate generally to clustering computers and more particularly relate to clustering without shared storage. Embodiments described herein facilitate the dynamic creation of a cluster without shared storage. For example, a new node may automatically determine that it is a master node if the new node is unable to communicate with another node. If the new node is able to communicate with other nodes in the cluster without shared storage, then the new node may determine that it is the preferred master, thereby automatically setting itself as a master node and setting the former master node as a slave node. If the new node is not the preferred master, then the new node may set itself as a slave node and join the cluster without shared storage.

When a new node is added to a cluster without shared storage, the new node may automatically communicate with a master node or slave node and receive data such as a repository from at least one of the nodes in the cluster without shared storage. For example, a new node may be added to a cluster without shared storage by installing software that is capable of communicating with other nodes and adding the address of a node in the cluster without shared storage. The new node may then automatically receive any additional settings such as the IP addresses of other nodes in the cluster without shared storage, data files, or other necessary or optional instructions from one or more nodes in the cluster. Thus, embodiments minimize the amount of manual configuration required to add a new node to a cluster without shared storage.

Embodiments described herein also facilitate the maintenance, reliability, and scalability of a cluster without shared storage. For example, if a master node in the cluster without shared storage becomes unavailable, then one of the slave nodes may automatically become the master node. Furthermore, each of the slave nodes in the cluster without shared storage may be able to perform write operations by requesting a lock from the master node.

These illustrative examples are given to introduce the reader to the general subject matter discussed here and are not intended to limit the scope of the disclosed concepts. The following sections describe various additional embodiments and examples with reference to the drawings in which like numerals indicate like elements.

Cluster without Shared Storage

Figure 1:
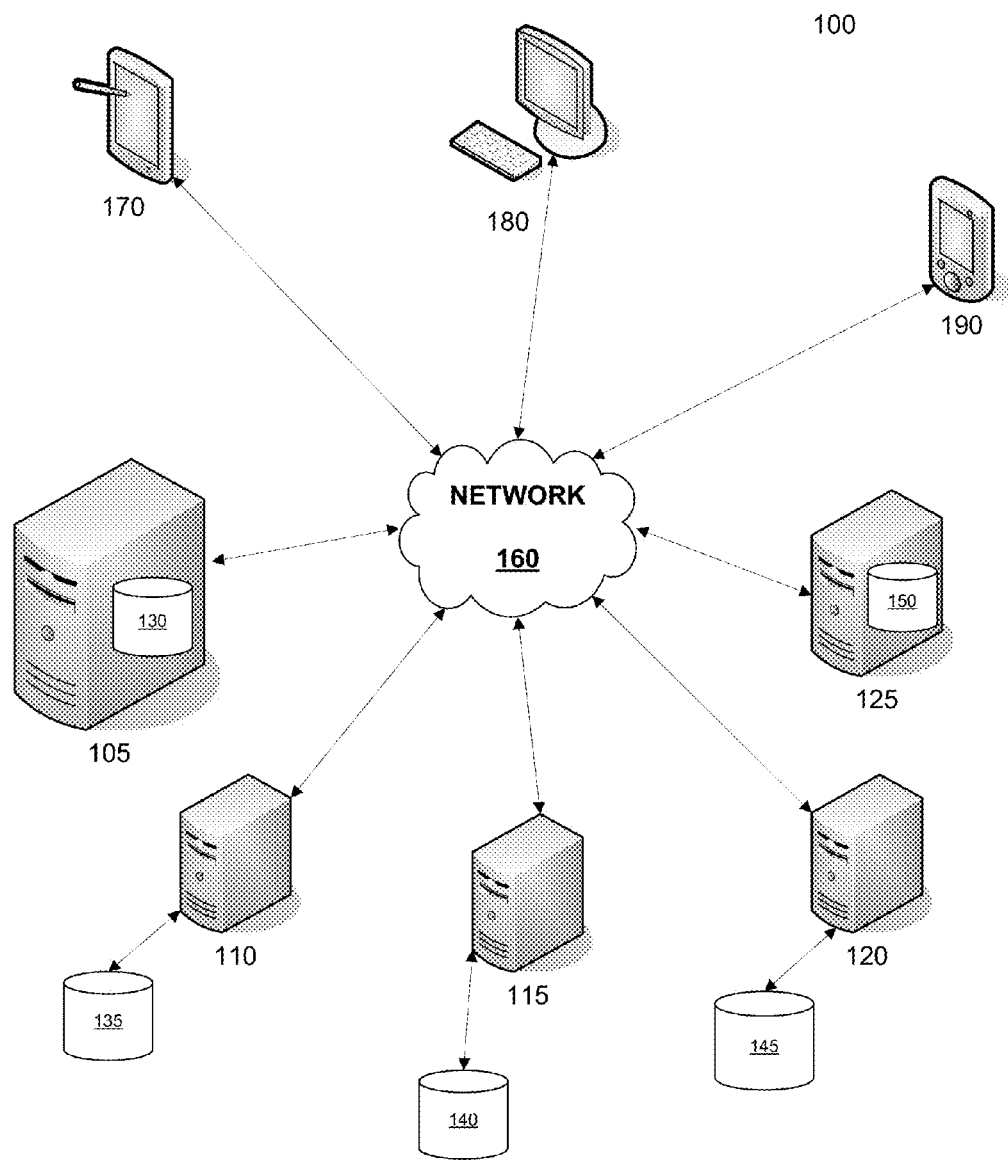
FIG. 1 is a system diagram depicting exemplary computing devices in an exemplary computing environment according to an embodiment.

Referring now to the drawings, FIG. 1 is a system diagram depicting exemplary computing devices in an exemplary computing environment according to one embodiment. The system 100 shown in FIG. 1 includes five cluster nodes, 105-125, and three client devices, 170-190. Each of the cluster nodes, 105-125, and client devices, 170-190, is connected to a network 160. Each of the cluster nodes, 105-125, is connected with a repository, 130-150, respectively. A cluster node may comprise the repository such as cluster node 105 comprising the repository 130. A cluster node may be in communication with a repository such as cluster node 110 being in communication with repository 135. The cluster without shared storage is configured such that each cluster node, 105-125, can only write data to its repository. Thus, cluster node 105 can only write to repository 130 and cluster node 115 can only write to repository 140. Generally, the repositories, 130-150, contain the same data, though at various times one or more of the repositories may contain less data than another repository until they are updated.

The ability of each cluster node, 105-125, in the cluster without shared storage to write data to its own repository may be beneficial for numerous reasons, especially where the repositories contain the similar or identical data. Unlike a shared-disk cluster where each node shares a single data source such as SAN or NAS and, thus, is susceptible to a single point of failure, the cluster without shared storage according to embodiments disclosed herein provides additional redundancies. If a single node or a single repository becomes unavailable, other nodes in the cluster without shared storage can respond to requests from client devices 170-190. For example, if cluster nodes 105 and repository 135 become unavailable, the cluster without shared storage may still be fully operational because cluster nodes 115-125 can access data from repositories 140-150, respectively, and respond to requests from client devices 170-190. Thus, in one embodiment, the cluster without shared storage provides redundancies that eliminate a single point of failure. In addition, embodiments of the cluster without shared storage may provide increased scalability over shared-disk clusters because each node of the cluster without shared storage can respond to request from client devices, 170-190, by accessing its own repository rather than a shared SAN or NAS Embodiments of a cluster without shared storage described herein may provide benefits over shared-nothing clusters. For example, rather than partitioning data across nodes in the cluster, in one embodiment, each cluster node may store data in its own repository and each repository may contain the same data. Thus, embodiments may eliminate the need of partitioning data across nodes and, therefore, eliminate the need for a routing table. Since any node, 105-125, in the cluster without shared storage may have access to a separate repository, 130-150 respectively, each containing identical data, any node can respond to requests from client devices 170-190. Rather than only the master node updating data and the other nodes have a mirrored copy of the repository of the master node, which may not be accessible to client devices 170-190, in one embodiment each node 105-125 can read and update data associated with the cluster without shared storage by reading or writing to or from its own repository, 130-150 respectively. Thus, embodiments may provide additional scalability, performance, high-availability, or failure recovery mechanisms.

In embodiments, two or more clusters without shared storage may be in communication with each other. For example, a first cluster without shared storage may be in communication with a second cluster without shared storage and a third cluster without shared storage. Each cluster may be responsible for a particular type of data. For example, the first cluster without shared storage may be responsible for and manage images, the second cluster without shared storage may be responsible for and manage client data, and the third cluster without shared storage may be responsible for and manage order data. The repository of each node in each cluster may comprise data related to its cluster. Thus, the repository of each node in the first cluster may comprise images, the repository of each node in the second cluster may comprise client data, and the repository of each node in the third cluster may comprise order data. In embodiments, a routing table can be used to determine which cluster a request is routed to.

In the system 100 depicted in FIG. 1, data can be managed using a master-slave mechanism. One of the cluster nodes, 105-125, can be selected to be the master node and the other nodes are set to be slave nodes. For example, cluster node 105 may be set as the master node because it has more processing power than the other nodes 110-125. In other embodiments, the master node may be selected in any number of ways. For example, cluster node 105 may be selected as the master node because a setting in a configuration file specifies that cluster node 105 is the preferred master node. Each node that is not a master node may be considered a slave node in the cluster without shared storage. As disclosed herein, a slave node may have to request and receive permission from a master node in order for the slave node to update its repository. For example, if cluster node 125 is a slave node and cluster node 120 is a master node, then slave node 125 may request permission from master node 120 before the slave node 125 can update data in its repository 150.

The repositories 130-150 may comprise append-only storage and content addressed storage that contains binary data. The append-only storage may comprise tar files and may be managed using Tar Persistence Manager (Tar PM). Tar PM comprises a transactional storage engine that supports atomicity, consistency, isolation, and durability. When a change is received, the Tar PM can append an entry to the newest file in a list of tar files in the repository. For example, when deleting content an empty entry may be added to the newest tar file. Thus, a change results in only one write operation. A separate optimize process may be used to remove old data and the optimize process may run at off-peak times. Thus, an append-only storage solution for the cluster without shared storage 100 may be beneficial because only one write operation may be required to change data. In other embodiments, other append-only data storage solutions may be used in a cluster without shared storage. A repository may include a database or other storage system that may or may not support append-only storage.

The network 160 facilities communications between the cluster nodes, 105-125, and the client devices 170-190. The network 160 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 160 may be a single network. In other embodiments, the network 160 may comprise two or more networks. For example, the client devices 170-190 may be connected to a first network and the cluster nodes 105-125 may be connected to a second network and the first and the second network may be connected. Numerous other network configurations would be obvious to an ordinary person of skill in the art.

The client devices, 170-190, may be any device capable of communicating with the network 160 and capable of requesting information from at least one of the cluster nodes 105-125. For example, the client device 170 is a tablet computer. The tablet computer 170 may include a touch-sensitive display and be able to communicate with the network 160 by using a wireless network interface card. The client device 180 may be a desktop computer. The desktop computer 180 may be in communication with a display and be able to connect with the network 160 through a wired network connection. The desktop computer 180 may be in communication with any number of user input devices such as a keyboard or a mouse. The client device 190 may be a mobile phone. The mobile phone 190 may be able to communicate with the network 160 over a wireless communications means such as TDMA, CDMA, GSM, or WiFi.

The cluster nodes 105-125 may be any device capable of communicating with the network 160 and capable of responding to requests received from at least one of the client devices 170-190. For example, a cluster node may be a general purpose computer. A cluster node may also be a specifically configured server designed to meet specified performance criteria. In an embodiment, a cluster node may be in communication with one or more processors, memories, or internal or external disk drives.

Each of the cluster nodes 105-125 may be capable of being a master or a slave node in the cluster without shared storage 100. For example, the server 105 may be the master node in the cluster without shared storage 100 because it has more processing power and a larger memory than the other nodes 110-125 in the cluster without shared storage 100. Thus, each of the other nodes 110-125 may be slave nodes in the cluster without shared storage 100.

Each of the cluster nodes 105-125 may be in the same location or in different locations. For example, in one embodiment, node 105 is in location A and connected with a first network and node 125 is in location B and connected with a second network. In this embodiment, the first network and the second network may be connected with network 160 so that node 105 can communicate with node 125.

Cluster Node

Figure 2:
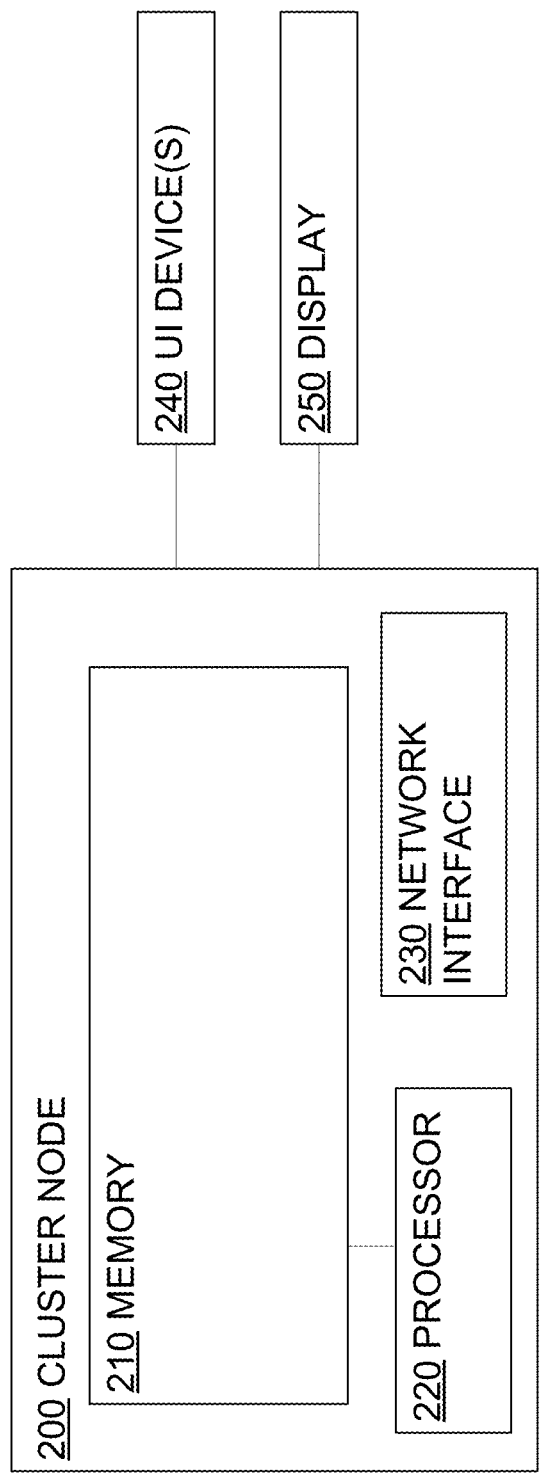
FIG. 2 is a block diagram depicting an exemplary cluster node according to an embodiment.

FIG. 2 is a block diagram depicting an exemplary cluster node 200 according to an embodiment. As shown in FIG. 2, the cluster node 200 comprises a computer-readable medium such as a random access memory (RAM) 210 coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. In one embodiment, the cluster node 200 may comprise a single type of computer-readable medium such as random access memory (RAM). In other embodiments, the cluster node 200 may comprise two or more types of computer-readable medium such as random access memory (RAM) and a disk drive. The cluster node 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, C#, Visual Basic, Java, Python, Perl, JavaScript, and ActionScript. In an embodiment, the cluster node 200 comprises a single processor 220. In other embodiments, the cluster node 200 comprises two or more processors 220.

The cluster node 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The cluster node 200 may comprise two or more network interfaces 230 for communication over one or more networks. In one embodiment, the cluster node 200 designated as a slave cluster node communicates with a master cluster node using two TCP/IP connections.

The cluster node 200 may comprise or be in communication with a number of external or internal devices such as a mouse, a CD-ROM, DVD, a keyboard, a display, audio speakers, one or more microphones, or any other input or output devices. For example, the cluster node 200 shown in FIG. 2 is in communication with various user interface devices 240 and a display 250. Display 250 may use any suitable technology including, but not limited to, LCD, LED, CRT, and the like.

Cluster node 200 may be a server, a desktop, a personal computing device, a mobile device, or any other type of electronic devices appropriate for providing one or more of the features described herein.

Updating Data in a Cluster Without Shared Storage

Figure 3:
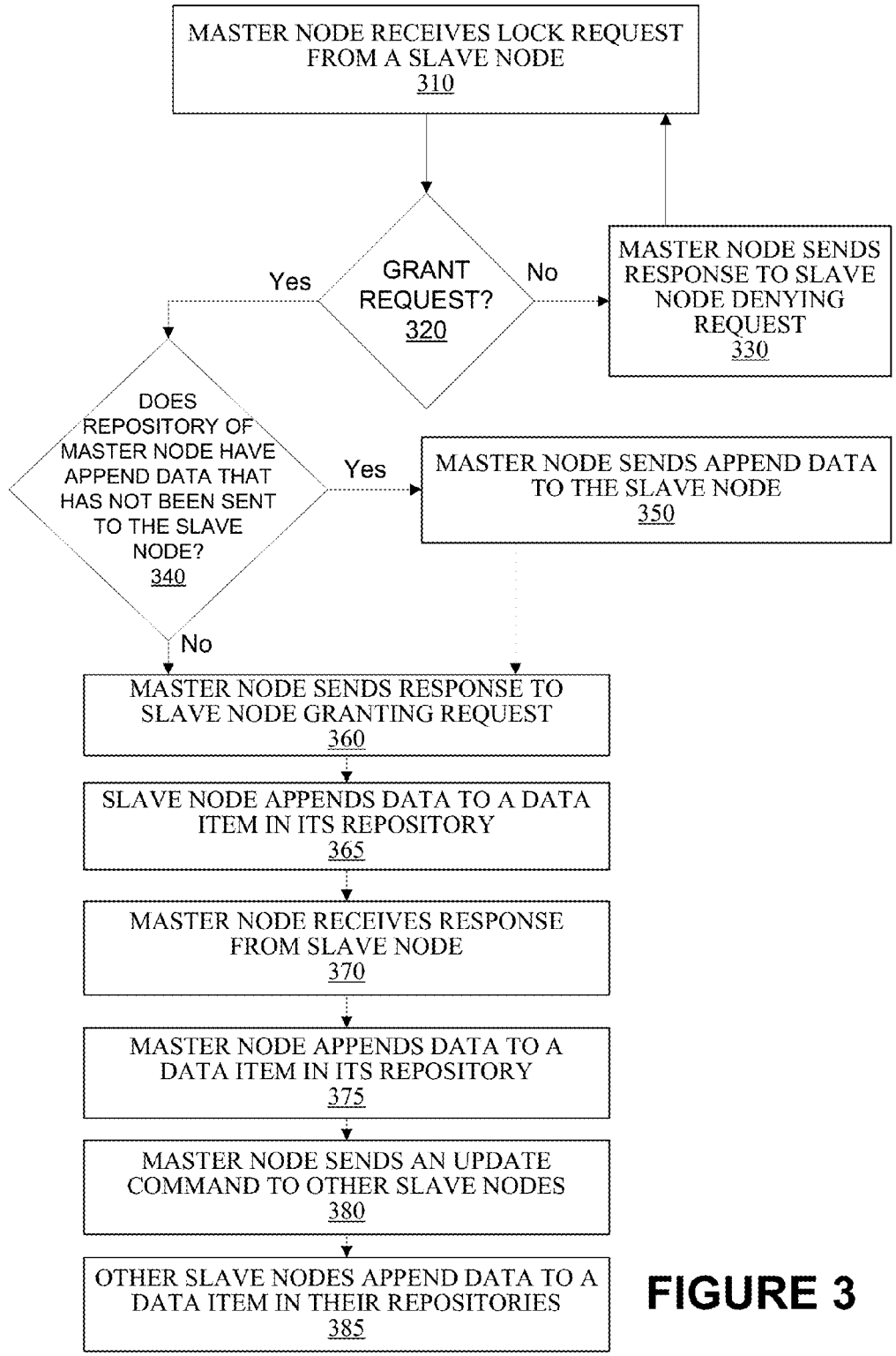
FIG. 3 is a flow chart illustrating a method of managing data in a cluster without shared storage that supports append-only changes according to an embodiment.

FIG. 3 is a flow chart illustrating a method of managing data in a cluster without shared storage that supports append-only changes. In FIG. 3, a master node receives a lock request from a slave node 310. The lock request may indicate that the slave node has received an update request from a client device or another node. For example, a client device may send a request to the slave node requesting that data be changed. Before making any changes to its repository, the slave node may send a lock request to the master node seeking permission to perform the update. The master node may then determine whether to grant the lock request received from the slave node 320 and may respond to the request by either denying the request 330 or granting the request 340. A lock request received by a master node from a slave node may be denied 330 for any number of reasons. For example, the lock request may be denied because either the master node is currently updating the same data item in its own repository. The lock request may also be denied because another slave node has already been granted permission to edit the same data item. Thus, while a master node and each slave node can only update its own repository, the master node controls whether or not updates may be made at any given time. In other words, a slave node may have to seek permission from the master node to update the slave node's repository even though neither the master node nor any of the other nodes in the cluster without shared storage may be able to update the repository of the slave node. In this way, the master node acts as a gatekeeper to ensure that each node in the cluster maintains an accurate repository.

If the lock request is denied 330, then a slave node can send the master another lock request at a later time. If the master node determines that the lock request should be granted, then the master node may immediately send the slave node a response granting the lock request 360. In one embodiment, before the master node grants the lock request 360, the master node determines whether the repository of the master node contains data that has not been sent to the slave node 340. For example, in one embodiment the master node may determine whether the repository includes any append-only data that has not been sent to the slave node that sent the lock request. One advantage of using an append-only update system is that the master node only needs to review the newest files to determine whether there is any data that needs to be sent to the slave node.

If the master node determines that the repository contains data that needs to be sent to the slave node 340, then the master node will send the append data to the slave node 350 before sending the slave node a response granting the lock request 360. Otherwise, the master node will simply send the slave node a response granting the lock request 360. After the slave node receives a response from the master node granting the lock request 360, the slave node can append data to a data item in its repository 365. When the slave node has finished updating the data item 365, the slave node may send a response to the master node indicating that the slave node has finished updating the data item 370. During the time that the master node sends the response to the slave node granting the request 360 until the master node receives a response from the slave node 370 that a lock is no longer needed for a data item, the master node may deny any request received from a node in the cluster without shared storage requesting to modify the same or a related data item.

Once the master node receives a response from the slave node 370, the master node may append data to a data item in its own repository 375. In an embodiment, the master node may append data to a data item in its own repository 375 upon receiving a lock request from a slave node 310 or after determining to grant a lock request 320. The master node may also send an update command to one or more slave nodes in the cluster without shared storage 380. In response to the update command, one or more slave nodes in the cluster without shared storage may update a data item in its repository 385. Thus, in one embodiment, the repository of the master node and the repositories of each of the slave nodes may contain the same data even though the master node can only write to its repository and each of the slave nodes can only write to its respective repository.

Determining a Master Cluster Node

Figure 4:
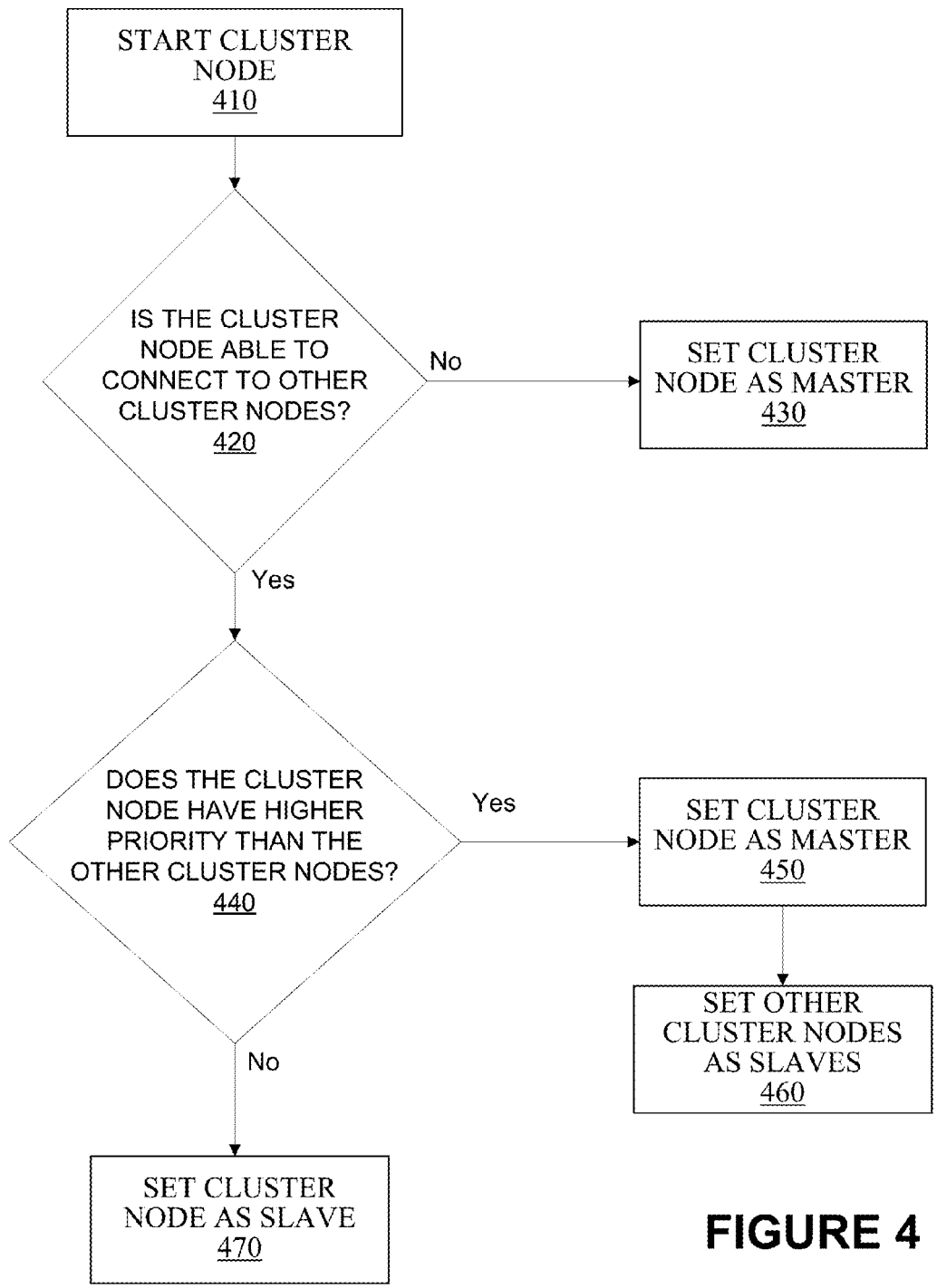
FIG. 4 is a flow chart illustrating a method of determining a master node when a cluster node is started according to an embodiment.

FIG. 4 is a flow chart illustrating a method of determining a master node when a cluster node is started. In the embodiment shown in FIG. 4, first the cluster node is started 410. The cluster node then attempts to connect to other cluster nodes 420. For example, in one embodiment, the cluster node contains a properties file that contains a list of IP addresses of other potential cluster nodes. In this embodiment, the cluster node traverses the list of IP addresses and attempts to connect with each of the IP addresses. If the cluster node is not able to connect with another cluster node, then the cluster node is set as the master cluster node 430. For example, in one embodiment, if the cluster node is not able to connect with any of the IP addresses in the properties file, then the cluster node is set as the master. If the cluster node is able to connect with one or more cluster nodes, then the cluster node may be set as a slave node 470.

In an embodiment, if the cluster node is able to connect with one or more cluster nodes, then a determination is made as to whether the cluster nodes has a higher priority than the other cluster nodes that it is able to connect with 440. For example, if the cluster node is able to connect with three other cluster nodes, then the cluster node may compare its priority level with the priority level of each of the three other cluster nodes. The priority level for a particular cluster node may be determined in any number of ways. In one embodiment, the priority level for a cluster node is automatically determined by software executed on the processor of the cluster node based upon one or more factors such as, for example, the speed of the processor(s), the number of processors(s), the amount of memory, the amount of free memory, or the load of the processor(s). In other embodiments, the priority level may be set manually.

In the embodiment shown in FIG. 4, if the cluster node does not have a higher priority level than each of the other cluster nodes it is able to connect with, then the cluster node is set as a slave node 470. If, however, the cluster node has a higher priority level than any of the other cluster nodes it is able to connect with, then the cluster node is set as the master node 450 and each of the other cluster nodes is set as a slave node 460.

Figure 5:
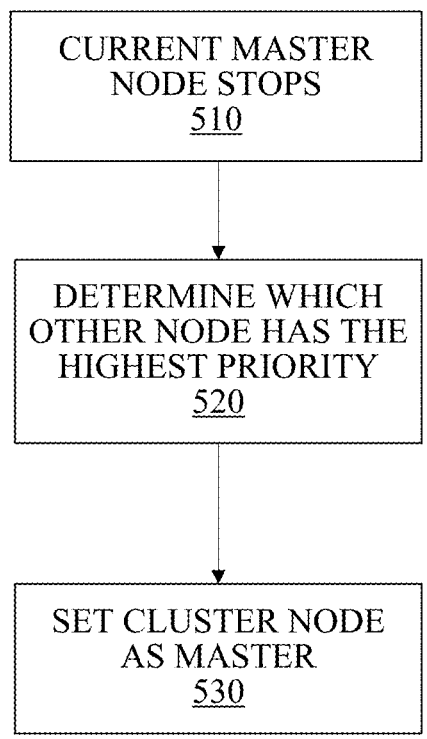
FIG. 5 is a flow chart illustrating a method of determining a master node when the current master node stops according to an embodiment.

FIG. 5 is a flow chart illustrating a method of determining a master node when the current master node stops. In one embodiment, the cluster without shared storage contains a single master node and a plurality of slave nodes. For various reasons, the master node may stop functioning 510. For example, a master node may stop functioning in the cluster because of a hardware failure, a software exception, a power outage, or loss of connectivity with a communications network. When the current master node stops functioning 510, other nodes (currently slave nodes) in the cluster compete to determine which node should become the new master node 520. For example, in one embodiment, each of the other nodes in the cluster communicates with each other in order to determine which node has the highest priority setting. In this embodiment, once the highest priority node is determined, that node in the cluster is set as the master node 530 and the other nodes remain slave nodes. In one embodiment, there may be two or more nodes that have the same priority setting that is higher than the other nodes. In this circumstance, software executed on one or more of the nodes may determine which of the nodes should be set as the master node. For example, the new master node may be determined based upon one or more factors such as the speed of the processor(s), the number of processors(s), the amount of memory, the amount of free memory, or the load of the processor(s) between the nodes that have the same highest priority setting.

Adding a New Node to a Cluster Without Shared Storage

Figure 6:
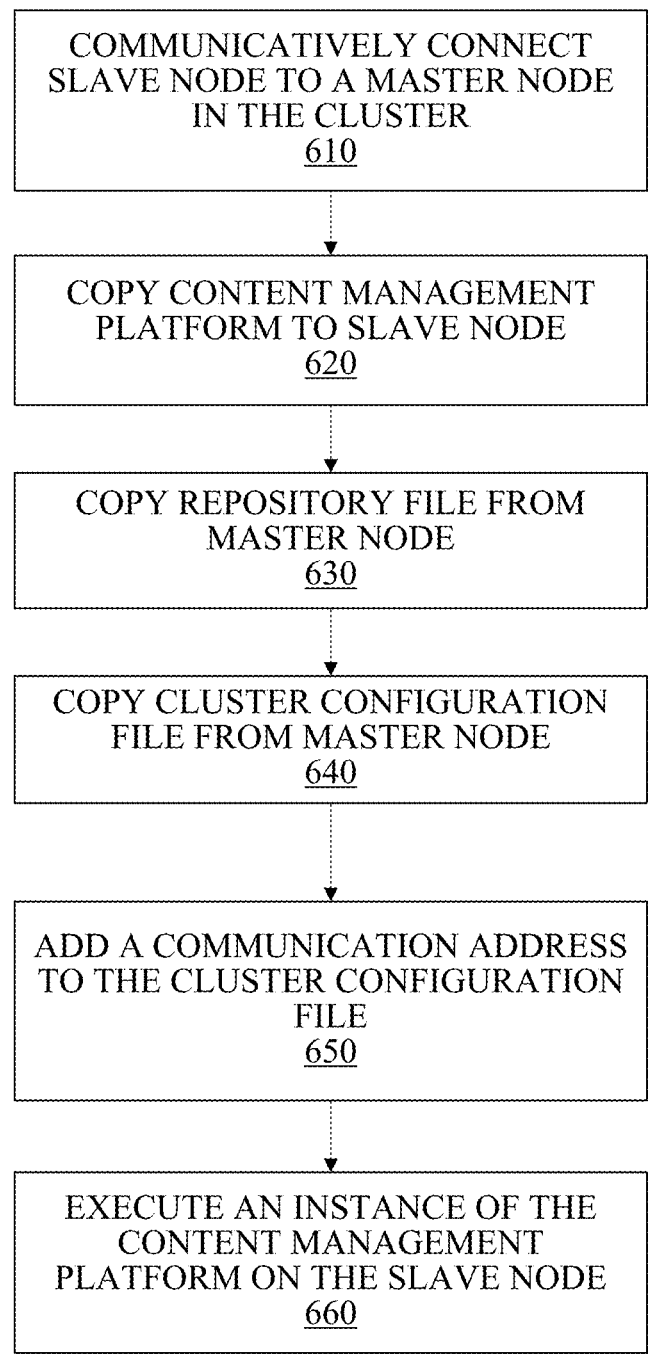
FIG. 6 is a flow chart illustrating a method of adding a slave node to a cluster without shared storage according to an embodiment.

FIG. 6 is a flow chart illustrating a method of adding a slave node to a cluster without shared storage according to an embodiment. In the embodiment shown in FIG. 6, the new slave node is communicatively connected with the master node in the cluster without shared storage 610. For example, the new slave node may be connected with the master through a wired or wireless network, directly connected via a USB or other cable, or any other suitable technology which enables the new slave node and the master to communicate with each other. The new slave node may be communicatively connected with the master through two or more network connections.

According to the embodiment shown in FIG. 6, a content management platform file is copied to the new slave node 620. The content management platform file may include any file or files that at least partially enable the new slave node to join the cluster without shared storage. For example, in one embodiment, the content management platform file may include an installation file for a content management platform application. Additional file(s) may be needed in order for the new slave node to be able to join the cluster without shared storage. For example, an application and a license may be included in the content management platform file according to one embodiment. In one embodiment, the content management platform is an application such as a version of Adobe© CRX© that is capable of joining a cluster without shared storage. The content management platform file may be in an archive or compressed format, or both, such as JAR, ZIP, RAR, ISO, or TAR. In an embodiment, the content management platform file may need to be unpacked on the new slave node. The content management platform file may be copied to the new slave node from any number of sources. For example, the new slave node may receive the content management platform file from a node in the cluster without shared storage, a USB drive, an optical disk, a network, or an Internet file location. The content management file may be copied from two or more sources.

In the embodiment shown in FIG. 6, after the content management platform is copied to the new slave node 620, a repository file is copied from the master node to the new slave node 630. The repository file may include any file or files that that is related to the data stored in the cluster without shared storage. For example, in one embodiment, the repository file may include the append-only data associated with the master node in the cluster without shared storage. In another embodiment, the repository file may include append-only storage as well as binary storage. For example, a complete copy of the append-only storage and the content address storage where binaries as stored may be copied from the master node to the new slave node. The repository file may include data related to a persistence manager such as Tar PM. The repository file may include data from a transactional storage engine or a database that supports append-only storage. The repository file may be in an archive or compressed format, or both, such as JAR, ZIP, RAR, ISO, or TAR. In one embodiment, the repository file may need to be unpacked on the new slave node. The repository file may be copied to the new slave node from any number of sources. For example, the new slave node may receive the repository file from a node in the cluster without shared storage, a USB drive, an optical disk, a network, or an Internet file location. The repository file may be copied from two or more sources.

In the embodiment shown in FIG. 6, after the repository file is copied to the new slave node 620, a cluster configuration file is copied from the master node to the new slave node 630. The cluster configuration file may include any file or files related to the settings or properties of the cluster without shared storage. For example, the cluster configuration file may include a list of internet protocol (IP) addresses of the other slave nodes in the cluster without shared storage. The configuration file may include other information such as, for example, a list of ports used by other cluster nodes, a unique cluster node id for one or more of the cluster nodes, or a unique cluster id. In one embodiment, the cluster configuration file copied to the new slave node also includes one or more internet protocol (IP) addresses for the master node in the cluster without shared storage, thereby eliminating the need for the new slave node to add a communication address of the master node to the cluster configuration file as described in 650. Alternatively, the cluster configuration file received by the new slave node need not include a communication address of the master node and the new slave node may add the communication address of the master node to the cluster configuration file 650. The cluster configuration file may be in an archive or compressed format, or both, such as JAR, ZIP, RAR, ISO, or TAR. In an embodiment, the cluster configuration file may need to be unpacked on the new slave node. The cluster configuration file may be copied to the new slave node from any number of sources. For example, the new slave node may receive the cluster configuration file from a node in the cluster without shared storage, a USB drive, an optical disk, a network, or an Internet file location. The cluster configuration file may be copied from two or more sources.

After receiving the cluster configuration file, according to the embodiment shown in FIG. 6, an instance of the content management platform is executed on the new slave node 660. After executing the content management platform, the new slave node may automatically join the cluster without shared storage. During the process of joining the cluster without shared storage, the new slave node may receive additional settings from one or more nodes in the cluster. For example, the new slave node may receive any new append data in the repository of the master node or another node in the cluster without shared storage. The new slave node may save the new append data into its own repository. The new slave node may also receive additional settings from one or more nodes in the cluster without shared storage. When the new slave node joins the cluster without shared storage, other nodes in the cluster may be updated. For example, the cluster configuration file on the master node or each of the slave nodes, or both, may be updated to include a communications address-such as an internet protocol (IP) address-of the new slave node.

The new node may be set as the master node and the former master node may be set as a slave node. For example, if the new node that is added to the cluster without shared storage has a higher priority setting than any of the other nodes in the cluster without shared storage, then the new node may be set as the master node.

Additional and/or alternative steps may be required for the new node to join the cluster without shared storage. Certain exemplary steps to join a cluster without shared storage may be combined or eliminated. For example, in FIG. 6, the steps of copying the content management platform to the node 620, copying the repository file 630, and copying the cluster configuration file 640 may be combined so that the new node receives a single file containing all of the data necessary for the new node to join the cluster without shared storage. Likewise, adding a communication address to the cluster communication file 650, may not be required if the new node receives a configuration that already includes any communication address needed to join the cluster without shared storage.

In one embodiment, a new node may be able to join a cluster without shared storage with minimal user involvement. For example, an application comprising a graphical user interface may be installed on a disk drive associated with the new node. In one embodiment, a user may input a communication address of a node in the cluster without shared storage and submit a request that the new node join the cluster without shared storage. The new node may then communicate with the node in the cluster without shared storage to receive a copy of the repository file from the master node 630, a cluster configuration file 640, and any additional files or settings for the new node to join the cluster without shared storage.

The various exemplary steps described herein to join a new node to a cluster without shared storage may be performed in any order as long as the new node is able to join the cluster without shared storage. For example, the new node may communicatively connect with another node in the cluster 610 after receiving a copy of the content management platform 620. In another embodiment, an instance of the content management platform is executed on the slave node 660 before a copy of the repository file form the master node 630 is received by the new node.

Figure 7:
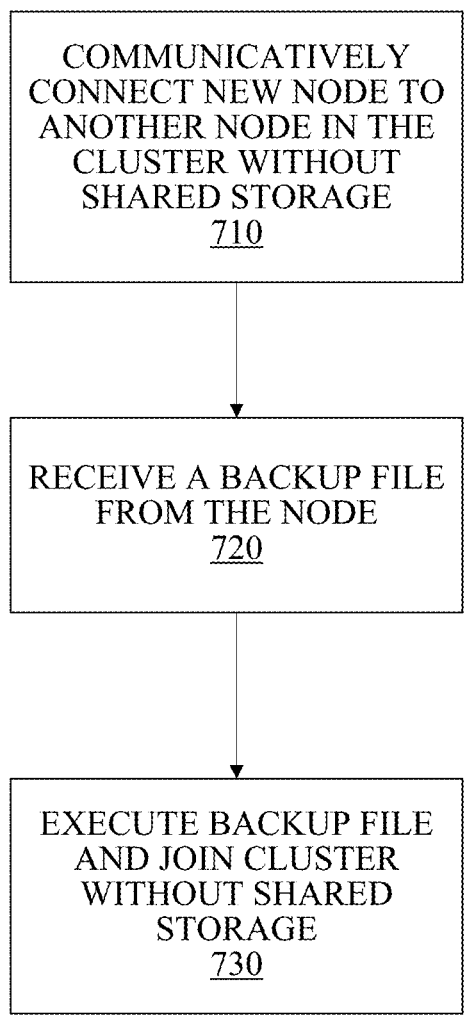
FIG. 7 is a flow chart illustrating a method of adding a slave node to a cluster without shared storage according to an embodiment.

FIG. 7 is a flow chart illustrating a method of adding a node to a cluster without shared storage. The new node is communicatively connected with another node in a cluster without shared storage 710. In the embodiment described in FIG. 7, the new node receives a backup file of the node 720. The backup file may include an installation file, an application for joining the cluster without shared storage, a repository file, a cluster configuration file, or other files or settings for joining the cluster without shared storage. The backup file may be in an archive or compressed format, or both, such as JAR, ZIP, RAR, ISO, or TAR. In one embodiment, the backup file may need to be unpacked on the new node. The backup file may be copied to the new node from any number of sources. For example, the new node may receive the backup file from a node in the cluster without shared storage, a USB drive, an optical disk, a network, or an Internet file location. The backup file may be copied from two or more sources. Thus, according to one embodiment, the new node does not need to be communicatively connected with another node in the cluster without shared storage until the new node attempts to join the cluster without shared storage. Once the backup file is received by the new node, either the backup file or a file contained in the backup file may be executed and the new slave node may automatically join the cluster without shared storage 730.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
    receiving, by a processor in communication with a master node, a lock request from a first slave node in a cluster without shared storage, the lock request associated with an update request sent from a computing device different than the master node and received by the first slave node, the update request comprising a datum,
        wherein the lock request indicates that the first slave node requires exclusive write access to a data item in a repository of the first slave node,
        wherein prior to receiving the lock request a repository of the master node comprises at least all data stored in the repository of the first slave node,
        wherein the master node is communicatively connected with a plurality of slave nodes, the plurality of slave nodes including the first slave node, and
        wherein the cluster without shared storage comprises the master node and the plurality of slave nodes, each node in the cluster without shared storage being connected with a separate repository, each node in the cluster without shared storage configured to exclusively update its repository, each slave node configured to update its repository only after receiving permission from the master node; and
    sending, by the processor in communication with the master node, a response to the first slave node granting the lock request based at least in part on data in the repository of the master node, the response authorizing the first slave node to append the datum to the data item in the repository of the first slave node.

2. The method of claim 1, further comprising:
    receiving, by the processor in communication with the master node, a second lock request from a second slave node in the cluster without shared storage, the second lock request indicating that the second slave node requires exclusive write access to a second data item in the repository of the second slave node; and
    sending, by the processor in communication with the master node, a second response to the second slave node denying the second lock request based at least in part on a relationship between the lock request from the first slave node and the second lock request from the second slave node.

3. The method of claim 1, further comprising:
    receiving, by the processor in communication with the master node, a release request from the first slave node, the release request indicating that the first slave node no longer requires exclusive write access to the data item in the repository of the first slave node.

4. The method of claim 3, further comprising:
    receiving, by the processor in communication with the master node, a second lock request from a second slave node in the cluster without shared storage, the second lock request indicating that the second slave node requires exclusive write access to a second data item in the repository of the second slave node, the data item and the second data item having a common characteristic; and
    sending, by the processor in communication with the master node, a second response to the second slave node granting the lock request based at least in part on the release request from the first slave node.

5. The method of claim 3, wherein after receiving the release request from the first slave node, the repository of the first slave node comprises the same data as the repository of the master node.

6. The method of claim 1, wherein the data item is the newest file in a plurality of append-only storage files in the repository of the first slave node.

7. The method of claim 1, wherein the update request comprises a request to add, delete, or modify data in the repository of the first slave node.

8. The method of claim 1, further comprising:
    after receiving the lock request from the first slave node and before sending the response to the first slave node granting the lock request:

sending, by the processor in communication with the master node, an update command to the first slave node, the update command comprising data previously appended to a second data item in the repository of the master node, the first slave node configured to append the data previously appended to the second data item in the repository of the master node to the data item in the repository of the first slave node in response to the update command.

9. The method of claim 1, further comprising:
appending, by the processor in communication with the master node, data received from the first slave node to a second data item in the repository of the master node.

10. The method of claim 1, further comprising:
sending, by the processor in communication with the master node, an update command to at least one node in the cluster without shared storage, the update command comprising data received from the first slave node, the at least one node configured to append data to a second data item in the repository of the node in response to the update command.

11. A system for an append-only, cluster without shared storage, comprising:
a network;
a computing device, the computing device connected with the network;
a master node comprising a processor, the master node connected with the network; and
a plurality of slave nodes, each slave node connected with the master node through the network, the append-only, cluster without shared storage comprising the master node and the plurality of slave nodes, each node in the cluster without shared storage being connected with a separate repository, each node in the cluster without shared storage configured to exclusively update its repository, each slave node configured to update its repository only after receiving permission from the master node; and
wherein a first slave node in the plurality of slave nodes is configured to:
receive an update request from the computing device;
send a lock request to the master node, the lock request indicating that the first slave node requires exclusive write access to a data item in a repository of the first slave node;
receive a response from the master node authorizing the first slave node to append data to the data item in the repository of the first slave node; and
append data to the data item in the repository of the first slave node;
wherein master node comprising the processor is configured to:
receive the lock request from the first slave node, wherein prior to receiving the lock request a repository of the master node comprises at least all data stored in the repository of the first slave node; and
send the response to the first slave node granting the lock request based at least in part on data in the repository of the master node.

12. A non-transitory computer-readable medium comprising program code for:
receiving, by a master node comprising a master repository, a lock request from a first slave node comprising a slave repository in a cluster without shared storage, the slave node configured to update the slave repository only after receiving permission from the master node, the lock request associated with an update request sent from a computing device different than the master node and received by the first slave node, the update request comprising a datum, the lock request indicating that the first slave node requires exclusive write access to a data item in the slave repository of the first slave node, wherein prior to receiving the lock request the master repository comprises at least all data stored in the slave repository; and
sending a response to the first slave node granting the lock request based at least in part on data in the master repository of the master node, the response authorizing the first slave node to append the datum to the data item in the slave repository of the first slave node.

13. A method, comprising:
receiving, by a slave node in a cluster without shared storage, an update request from a computing device other than a master node in the cluster without shared storage;
sending, by the slave node in the cluster without shared storage, a lock request to the master node in the cluster without shared storage, the lock request indicating that the slave node requires exclusive write access to a data item in a first repository of the slave node;
receiving, by the master node in the cluster without shared storage, the lock request from the slave node;
sending, by the master node in the cluster without shared storage, a first response to the slave node, the first response granting the slave node exclusive write access to the data item in the first repository of the slave node;
receiving, by the slave node in the cluster without shared storage, the first response from the master node; and
updating, by the slave node in the cluster without shared storage, the data item in the first repository of the slave node based at least in part on information in the update request.

14. The method of claim 13, further comprising:
determining, by the master node in the cluster without shared storage, whether a second repository of the master node comprises data that has not been sent to the slave node; and
in response to determining that the second repository of the master node comprises data that has not been sent to the slave node, sending, by the master node, the data to the slave node prior to or concurrently with sending the response granting the slave node exclusive write access to the data item in the first repository of the slave node.

15. The method of claim 13, further comprising:
sending, by the slave node in the cluster without shared storage, a second response to the master node, the second response indicating that the slave node has updated the data item in the first repository of the slave node;
receiving, by the master node in the cluster without shared storage, the second response from the slave node; and
updating, by the master node in the cluster without shared storage, a second repository of the master node based at least in part on information received from the slave node.

16. The method of claim 15, further comprising:
sending, by the master node in the cluster without shared storage, an update command to a second slave node in the cluster without shared storage, the update command instructing the second slave node to update a third repository of the second slave node.

17. The method of claim 13, further comprising:
receiving, by a first node, an installation file for an application, the application configured to assist the first node in joining the cluster without shared storage;
receiving, by the first node, a copy of a second repository of the second node; and storing, by the first node, the copy of the second repository to a third repository of the first node.

18. The method of claim 17, wherein the second node is the slave node.

19. The method of claim 17, further comprising:
receiving, by the first node, a cluster configuration file corresponding to the cluster without shared storage.

20. The method of claim 17, further comprising:
receiving, by the first node, a communication address for joining the cluster without shared storage; and
updating, by the first node, a cluster configuration file with the communication address for joining the cluster without shared storage.

21. The method of claim 20, wherein the application comprises a content management platform and wherein the method further comprises:
executing the content management platform on the first node, wherein the content management platform, when executed, is configured to automatically connect the first node with the cluster without shared storage based at least in part on the cluster configuration file.

22. The method of claim 17, wherein at least one of the installation file or the copy of the second repository is received from at least one of the second node, a USB drive, an optical disk, a network file source, or an Internet file source.

23. The method of claim 17, wherein the copy of the second repository comprises append-only data, binary data, or an index.

24. The method of claim 17, further comprising:
constructing an index of at least a portion of the third repository.

25. The method of claim 17, wherein the first node is the slave node and the second node is the master node.

* * * * *